Patented Sept. 30, 1952

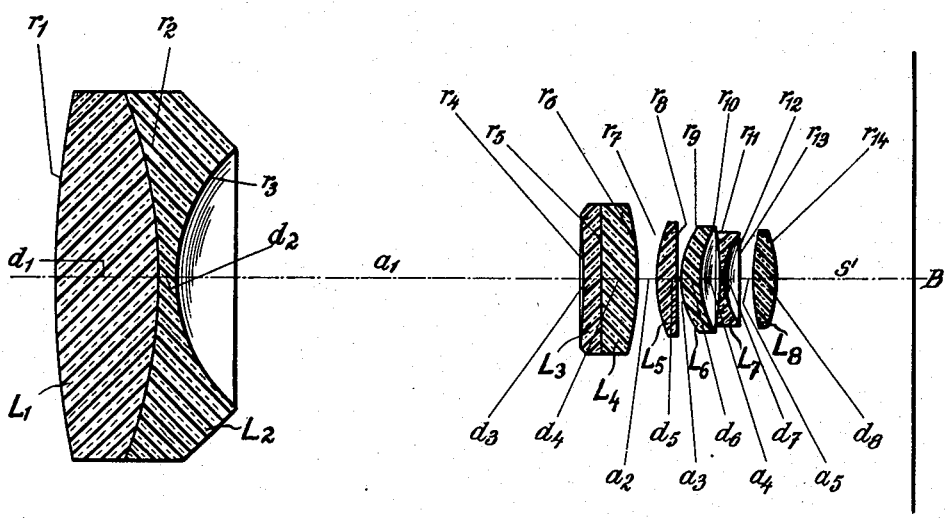

2,612,077

UNITED STATES PATENT OFFICE 2,612,077

WIDE-ANGLE HIGH-SPEED PHOTOGRAPHIC OBJECTIVE

Wolfram Wilhelm Albrecht, Kreuznach, Germany, assignor to Jos. Schneider & Co., Kreuznach, Germany Application March 15, 1951, Serial No. 215,734
In Germany June 20, 1950

3 Claims. (Cl. 88—57)

The present invention relates to wide-angle high-speed photographic objectives for the taking of pictures or for the reproduction thereof, and more particularly to an objective comprising a relatively large number (preferably not less than five) of simple and/or compound lens members spaced in air.

The general object of this invention is to provide an objective of this character which is anastigmatic and free from chromatic and longitudinal as well as lateral spherical aberration, which eliminates image curvature, and wherein the angle of view is wider than heretofore attainable with comparable objectives.

In a preferred embodiment the first of the five or more lens members of the objective consists of a diverging meniscus whose spacing in air from the remaining members is greater than the overall focal length of the system. According to the invention, the first air space (starting from the side where the path traversed by the light rays is longer) equals at least three times the focal length of the entire system and the absolute magnitude of the focal length of the first member alone equals at least four times said overall focal length, all the radii being greater than 0.7 times the overall focal length. According to another feature of the invention, the distance between the image plane and the apex of the last member of the objective (hereinafter referred to as the image distance) is likewise greater than the said overall focal length.

The last-mentioned feature is of particular importance in the case of narrow-film motion picture apparatus (camera as well as projector), i. e. apparatus using 8 or 16 mm. film, inasmuch as here the image distance, defining the space where the shutter and other parts of the mechanism are to be disposed, has to be relatively large especially where it is desired to use objectives with a wide angle of view and, hence, reduced focal length and where, therefore, the absolute dimensions of the optical system are quite small.

In known optical systems of the general character set forth, in which the conditions hereinabove specified were not met, it has not been possible to obtain angles of view exceeding 35 to 40°, whereas with a system according to the present invention angles of 50° and more are available.

A preferred embodiment of the invention has been illustrated, somewhat schematically, in the sole figure of the accompanying drawing.

As shown in the drawing, the objective according to the invention comprises a first lens member consisting of a biconvex lens $L_1$ cemented to a biconcave lens $L_2$; lens $L_1$ has a thickness $d_1$ and radii of curvature $r_1$, $r_2$, whereas lens $L_2$ has a thickness $d_2$ and radii $r_2$, $r_3$. The distance between this member and the second member, which is also of the compound type and consists of biconcave lens $L_3$ and biconvex lens $L_4$, is $a_1$; lens $L_3$ has a thickness $d_3$ and radii $r_4$ and $r_5$, whereas lens $L_4$ has a thickness $d_4$ and radii $r_5$ and $r_6$. Four simple lenses $L_5$ (biconvex, thickness $d_5$, radii $r_7$ and $r_8$), $L_6$ (converging meniscus, thickness $d_6$, radii $r_9$ and $r_{10}$), $L_7$ (biconcave, thickness $d_7$, radii $r_{11}$ and $r_{12}$) and $L_8$ (biconvex, thickness $d_8$, radii $r_{13}$ and $r_{14}$) complete the objective, the spacing of each of these lenses from the preceding one being designated $a_2$, $a_3$, $a_4$ and $a_5$, respectively. The image plane has been indicated at B, and the image distance, or spacing of lens $L_8$ from plane B, at $S'$.

Representative values of the parameters indicated in the drawing (radii $r$, thicknesses $d$ and distances $a$) have been given, by way of example, in the following table, taking the overall focal length as unity ($f=1$). Also indicated in the table are the indices of refraction $n_1 \ldots n_8$ of the lenses $L_1 \ldots L_8$, respectively; finally, the values $\nu_1 \ldots \nu_8$ represent Abbé's number, or the supermagnification coefficient, as defined, for example, in an article by Prof. Ernst Abbé which appeared in the Journal of the Royal Microscopic Society (2) of the year 1882, entitled "The relation of aperture and power in the microscope."

| | | | | |
|---|---|---|---|---|
| $L_1$ | $r_1 = +13.32$ | $d_1 = 0.925$ | $n_1 = 1.6727$ | $\nu_1 = 32.2$ |
| | $r_2 = -5.027$ | | | |
| $L_2$ | | $d_2 = 0.182$ | $n_2 = 1.5101$ | $\nu_2 = 63.4$ |
| | $r_3 = +1.606$ | | | |
| | | $a_1 = 3.880$ | | |
| | $r_4 = -8.158$ | | | |
| $L_3$ | | $d_3 = 0.182$ | $n_3 = 1.6727$ | $\nu_3 = 32.2$ |
| | $r_5 = +26.99$ | | | |
| $L_4$ | | $d_4 = 0.367$ | $n_4 = 1.5101$ | $\nu_4 = 63.4$ |
| | $r_6 = -2.595$ | | | |
| | | $a_2 = 0.147$ | | |
| | $r_7 = +1.406$ | | | |
| $L_5$ | | $d_5 = 0.220$ | $n_5 = 1.6204$ | $\nu_5 = 60.3$ |
| | $r_8 = -22.94$ | | | |
| | | $a_3 = 0.004$ | | |
| | $r_9 = +0.840$ | | | |
| $L_6$ | | $d_6 = 0.217$ | $n_6 = 1.6204$ | $\nu_6 = 60.3$ |
| | $r_{10} = +1.077$ | | | |
| | | $a_4 = 0.148$ | | |
| | $r_{11} = -2.800$ | | | |
| $L_7$ | | $d_7 = 0.062$ | $n_7 = 1.6990$ | $\nu_7 = 30.1$ |
| | $r_{12} = +0.722$ | | | |
| | | $a_5 = 0.298$ | | |
| | $r_{13} = +2.010$ | | | |
| $L_8$ | | $d_8 = 0.235$ | $n_8 = 1.6385$ | $\nu_8 = 55.5$ |
| | $r_{14} = -1.101$ | | | |

The objective illustrated and dimensioned as indicated in the foregoing table has an image distance $S' = 1.313$, hence considerably greater than the overall focal length $f$, an angle of view of 50°, and an aperture ratio of 1:1.9; the focal length of the first member $L_1$, $L_2$ is $f'=4.48$, being thus in excess of $4f$. The total axial length of the objective, readily computable from the above table, is 6.867, thus approximately seven times the overall focal length $f$.

It should be understood that departures from the specific arrangement illustrated and from the precise values given above are possible within the spirit of the invention and without exceeding its scope as defined in the appended claims.

What is claimed is:

1. A wide-angle high-speed photographic objective comprising a diverging first lens member and at least four additional lens members spaced in air from one another, said objective having a predetermined overall focal length, the spacing between said first lens member and the nearest of said additional lens members being equal to at least three times said overall focal length, said first and additional lens members having refractive surfaces with radii of curvature all greater than 0.7 times said overall focal length, said first lens member having a focal length equal to at least four times said overall focal length, the total axial length of the objective being not greater than substantially seven times said overall focal length.

2. A wide-angle high-speed photographic objective comprising a diverging first lens member and at least four additional lens members spaced in air from one another, said objective having a predetermined overall focal length, the spacing between said first lens member and the nearest of said additional lens members being equal to at least three times said overall focal length, said first and additional lens members having refractive surfaces with radii of curvature all greater than 0.7 times said overall focal length, said first lens member having a focal length equal to at least four times said overall focal length, said objective having an image distance, measured between an image plane remote from said first member and the additional lens member nearest said image plane, greater than said overall focal length, the total axial length of the objective being not greater than substantially seven times said overall focal length.

3. An objective according to claim 2 wherein said diverging first lens member consists of two cemented lenses $L_1$, $L_2$ having radii of curvature $r_1$, $r_2$ and $r_3$, the first of said additional lens members consists of two cemented lenses $L_3$, $L_4$ having radii of curvature $r_4$, $r_5$, $r_6$ and is spaced from said diverging first lens member by a distance $a_1$, and the remaining additional lens members are four simple lenses $L_5$, $L_6$, $L_7$, $L_8$ each spaced by a distance $a_2$, $a_3$, $a_4$, $a_5$, respectively, from the respectively preceding lens member and having radii of curvature $r_7$, $r_8$; $r_9$, $r_{10}$; $r_{11}$, $r_{12}$; $r_{13}$, $r_{14}$, respectively; said objective having an angle of view of substantially 50° and an aperture ratio of substantially 1:1.9; the image distance $S'$, the focal length $f'$ of said diverging first member, the thicknesses $d_1 \ldots d_8$, refractive indices $n_1 \ldots n_8$ and Abbé numbers $\nu_1 \ldots \nu_8$ of said lenses $L_1 \ldots L_8$, the said radii of curvature $r_1 \ldots r_{14}$ and the said distances $a_1 \ldots a_5$ having numerical values, based upon a value of unity for the overall focal length of the objective, substantially as given in the following table:

| | | | | |
|---|---|---|---|---|
| $L_1$ | $r_1 = +13.32$ | $d_1=0.925$ | $n_1=1.6727$ | $\nu_1=32.2$ |
| $L_2$ | $r_2 = -5.027$ | $d_2=0.182$ | $n_2=1.5101$ | $\nu_2=63.4$ |
| | $r_3 = +1.606$ | | | |
| | $r_4 = -8.158$ | $a_1=3.880$ | | |
| $L_3$ | $r_5 = +26.99$ | $d_3=0.182$ | $n_3=1.6727$ | $\nu_3=32.2$ |
| $L_4$ | $r_6 = -2.595$ | $d_4=0.367$ | $n_4=1.5101$ | $\nu_4=63.4$ |
| | $r_7 = +1.406$ | $a_2=0.147$ | | |
| $L_5$ | $r_8 = -22.94$ | $d_5=0.220$ | $n_5=1.6204$ | $\nu_5=60.3$ |
| | $r_9 = +0.840$ | $a_3=0.004$ | | |
| $L_6$ | $r_{10} = +1.077$ | $d_6=0.217$ | $n_6=1.6204$ | $\nu_6=60.3$ |
| | $r_{11} = -2.800$ | $a_4=0.148$ | | |
| $L_7$ | $r_{12} = +0.722$ | $d_7=0.062$ | $n_7=1.6990$ | $\nu_7=30.1$ |
| | $r_{13} = +2.010$ | $a_5=0.298$ | | |
| $L_8$ | $r_{14} = -1.101$ | $d_8=0.235$ | $n_8=1.6385$ | $\nu_8=55.5$ |

WOLFRAM WILHELM ALBRECHT.

REFERENCES CITED

The following references are of record in the file of this patent:

UNITED STATES PATENTS

| Number | Name | Date |
|---|---|---|
| 756,779 | Dallmeyer | Apr. 5, 1904 |
| 1,897,262 | Kitroser | Feb. 14, 1933 |
| 1,934,561 | Rayton | Nov. 7, 1933 |
| 1,955,590 | Lee | Apr. 17, 1934 |
| 1,996,054 | Bowen | Apr. 2, 1935 |
| 2,184,018 | Ort | Dec. 19, 1939 |
| 2,247,068 | Richter | June 24, 1941 |
| 2,324,057 | Bennett | July 13, 1943 |